(12) United States Patent
Beck et al.

(10) Patent No.: US 7,161,587 B2
(45) Date of Patent: Jan. 9, 2007

(54) METHOD, APPARATUS AND COMPUTER PROGRAM PRODUCT FOR PROVIDING KEYBOARD ASSISTANCE TO A SOFTWARE APPLICATION USER

(75) Inventors: Chao M. Beck, Austin, TX (US); Hypatia Rojas, Round Rock, TX (US); David Neal Rundell, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 10/640,843

(22) Filed: Aug. 14, 2003

(65) Prior Publication Data
US 2005/0035949 A1    Feb. 17, 2005

(51) Int. Cl.
*G09G 5/00* (2006.01)

(52) U.S. Cl. .......................................... 345/168; 341/21

(58) Field of Classification Search ........ 345/145–146, 345/156–158, 168, 170, 171–172; 341/22–23
See application file for complete search history.

(56) References Cited

U.S. PATENT DOCUMENTS

| | | | | |
|---|---|---|---|---|
| 4,885,565 A | 12/1989 | Embach | .................. | 340/407.2 |
| 5,107,743 A | 4/1992 | Decker | ...................... | 84/478 |
| 5,181,029 A | 1/1993 | Kim | ........................... | 241/20 |
| 5,189,390 A | 2/1993 | Fagard | .................... | 340/407.2 |
| 5,515,045 A | 5/1996 | Tak | ............................. | 341/23 |
| 5,638,060 A | 6/1997 | Kataoka et al. | ............... | 341/20 |
| 5,736,976 A | 4/1998 | Cheung | ...................... | 345/168 |
| 5,818,361 A | 10/1998 | Acevedo | ..................... | 341/23 |
| 5,936,554 A | 8/1999 | Stanek | ......................... | 341/22 |
| 5,977,867 A | 11/1999 | Blouin | ..................... | 340/407.2 |
| 6,402,616 B1 | 6/2002 | Ogata et al. | .................. | 463/37 |
| 2004/0104893 A1* | 6/2004 | Huang | ........................ | 345/168 |
| 2004/0183783 A1* | 9/2004 | Rojas et al. | ................ | 345/168 |

OTHER PUBLICATIONS

"Method and Apparatus for Improved Keyboard Accessiblility Using Vibrating Keys", IBM Application.

* cited by examiner

*Primary Examiner*—Richard Hjerpe
*Assistant Examiner*—Mansour M. Said
(74) *Attorney, Agent, or Firm*—John D. Flynn; Anthony V. S. England

(57) ABSTRACT

A software application has certain keyboard hot key combinations. If the application is active the pressing of a key is detected for the application. A number of keyboard keys are selected responsive to the key pressed. The selected keys correspond to hot key combinations that include the pressed key. The keyboard is signaled to differentiate the selected keys. Further, the application is operable to have a number of contexts, where certain ones of the hot key combinations are only valid for certain of the contexts. For example, where the application includes a word processing function one of the application contexts is a circumstance in which text is selected. Accordingly, the method includes detecting the context of the application and the selecting is responsive to that context. In this situation the selected keys correspond to hot key combinations that include the pressed key and that are valid for the detected context.

15 Claims, 4 Drawing Sheets

METHOD, APPARATUS AND COMPUTER PROGRAM PRODUCT FOR PROVIDING KEYBOARD ASSISTANCE TO A SOFTWARE APPLICATION USER

CROSS-REFERENCE TO RELATED APPLICATION

This application is related to U.S. patent application Ser. No. 10/392,760 filed Mar. 19, 2003, entitled METHOD AND APPARATUS FOR IMPROVED KEYBOARD ACCESSIBILITY USING VIBRATING KEYS, that is assigned to the same assignee as the present application and is hereby incorporated herein by reference.

BACKGROUND

1. Field of the Invention

The present invention relates to generating discrete signals in the context of a computer system, and, more particularly, to generating such signals using a keyboard.

2. Related Art

It has long been recognized that there are difficulties in the way people interact with computers. This has led to many improvements over the years. With regard to computer keyboards, the subject of the present invention, there has been an evolution from the simple reproduction of the typewriter keyboard to today's more elaborate devices that have ergonomic shapes and include various indicator lights and dedicated function keys. For example, it is now common for keyboards to have indicator lights that illuminate when the "caps lock" key is depressed.

One keyboard improvement is described in U.S. Pat. No. 5,936,554 to Stanek (the "Stanek" patent). Stanek primarily focuses on novice computer users who may not know which key to press on the keyboard in a given circumstance. According to the Stanek patent, if pressing the "enter" key is the only proper response to a program the computer sends a signal to the keyboard to illuminate the "enter" key. Stanek describes using this concept for lighting up one key at a time for a program that teaches typing or for lighting up a number of keys at a time for a computer game in which there is a certain set of keys that can be used to control the game.

While it is useful to automatically illuminate one or more keys as currently practiced, the known techniques provide little help for more sophisticated users who already have a general idea of what keys are appropriate in a given circumstance. Therefore a need exists for further improvements.

SUMMARY OF THE INVENTION

The foregoing need is addressed in the present invention. According to one form of the invention, for a user running a software application that has certain hot key combinations (also known as "shortcut" keys) the user is interactively given keyboard prompts to help in choosing valid hot keys. That is, while the user may recall that a certain key, such as the "control" key for example, is common to a number of hot key combinations, the user may not recall all the combinations. So according to the present invention the user may press the "control" key to interactively initiate automatic keyboard prompting. A number of keyboard keys are automatically selected responsive to detecting the key pressed, where the selected keys correspond to hot key combinations that include the pressed key. At least one signal is sent for causing the keyboard to perceptibly differentiate the selected keys from all its other keys, for example, to illuminate the selected keys.

In a further aspect, the active software application is operable to have a number of contexts, where certain ones of the hot key combinations are valid for some of the contexts and not valid for others. For example, in an instance where the application includes a word processing function, one of the application contexts is a circumstance in which text is selected. Accordingly, the method includes detecting the context of the application and the selecting is responsive to the detected context. In this situation the selected keys correspond to hot key combinations that include the pressed key and that are valid for the detected context.

Additional objects, advantages, aspects and other forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1A:
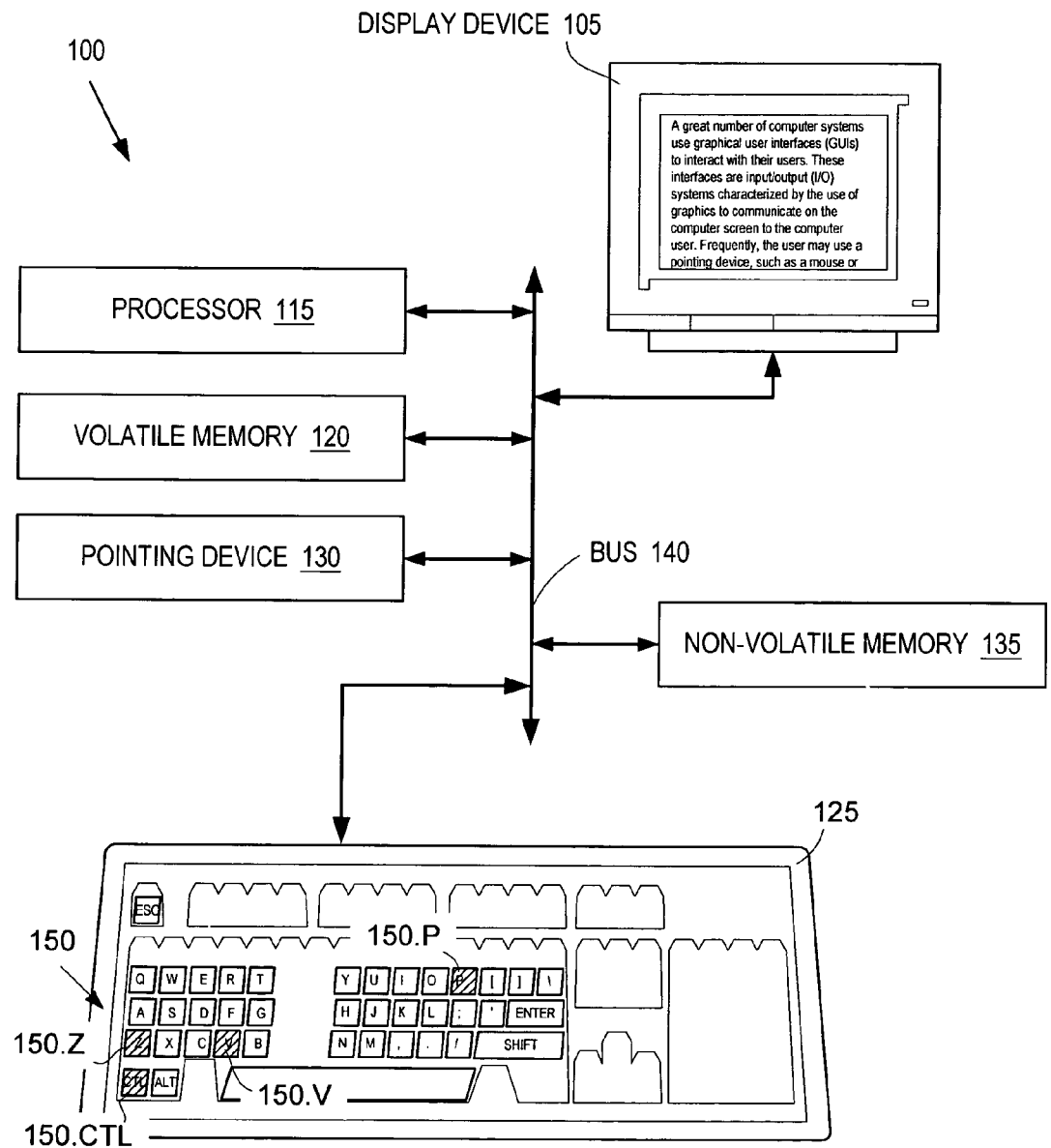
FIG. 1A illustrates a system and a first group of illuminated hot key combinations for a first context, according to an embodiment of the present invention.

Referring now to FIG. 1A, a block diagram illustrating a computer system 100 is shown, according to an embodiment of the present invention. The system 100 includes a processor 115, a volatile memory 120, e.g., RAM, a keyboard 125, a pointing device 130, e.g., a mouse, a nonvolatile memory 135, e.g., ROM, hard disk, floppy disk, CD-ROM, and DVD, and a display device 105 having a display screen. Memory 120 and 135 are for storing program instructions, which are executable by processor 115, to implement various embodiments of a method in accordance with the present invention. Components included in system 100 are interconnected by bus 140. A communications device (not shown) may also be connected to bus 140 to enable information exchange between system 100 and other devices.

In various embodiments system 100 takes a variety of forms, including a personal computer system, mainframe computer system, workstation, Internet appliance, PDA, an embedded processor with memory, etc. That is, it should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C, C++ objects, Java and commercial class libraries.

The keyboard 125 has a number of keys 150 which a user presses to send discreet signals to the system 100. In the illustrated instance the system 100 is running a word-processing software application, such as Lotus WordPro. ("WordPro" is a trademark of the IBM Corporation.) The software application is capable of operating in a number of different states, that is, it is capable of having a number of different contexts. For example, one state or context is one in which the user is typing new text at the current cursor location in the workspace that is shown on the display device 105. In another context the application has text that has been selected by the user for copying, deleting or moving, such as by highlighting text in the workspace shown on the monitor with a pointing device for copying, deleting or moving. In another context the user is invoking commands, such as by clicking on drop-down menus or by pressing specific combinations of keys, that is, "shortcut" or "hot" keys.

In FIG. 1A the user has not selected any of the text shown on the display 105. According to an embodiment of the present invention, a software process, which may or may not be included in the word-processing or other such software application, monitors the keys 150 of the keyboard 125 and also monitors the context of the software application. In general terms, responsive to detecting that the user has pressed one of the keys 150 that is common to a number of hot key combinations the process selects a set of the keys 150 and initiates a signal or set of signals for causing the keyboard 125 to perceptibly differentiate the selected keys 150 from the other keys 150 on the keyboard 125. (In a preferred embodiment this differentiation includes lighting up the selected keys 150. Alternatively, if the keys 150 of the keyboard 125 were already eliminated at the time the process selects keys 150 then the differentiation involves dimming or extinguishing the lights of the selected keys 150.)

In terms of the instance illustrated in FIG. 1A, the user has pressed the "Control" key 150.CTL, which the process detects. The process also determines that the "Control" key 150.CTL is a key 150 that is common to a number of hot key combinations. The process also determines that the context of the software application, that is, the word-processing application in the present instance, is one in which no text has been selected, there has been a previous editing command, and there is text that has been temporarily saved, i.e., to the "scratch pad" or "clipboard," as it is variously referred to. The process also determines that for this context a certain set of keys 150 are valid hot key combinations that include the "Control" key 150.CTL that the user has pressed. In the illustrated instance this set includes, as shown, the "Z" key 150.Z, which will undo the previous editing command, the "V" key 150.V, which will paste the text that is on the clipboard, and the "P" key 150.P, which will send a print job to the printer.

Figure 1B:
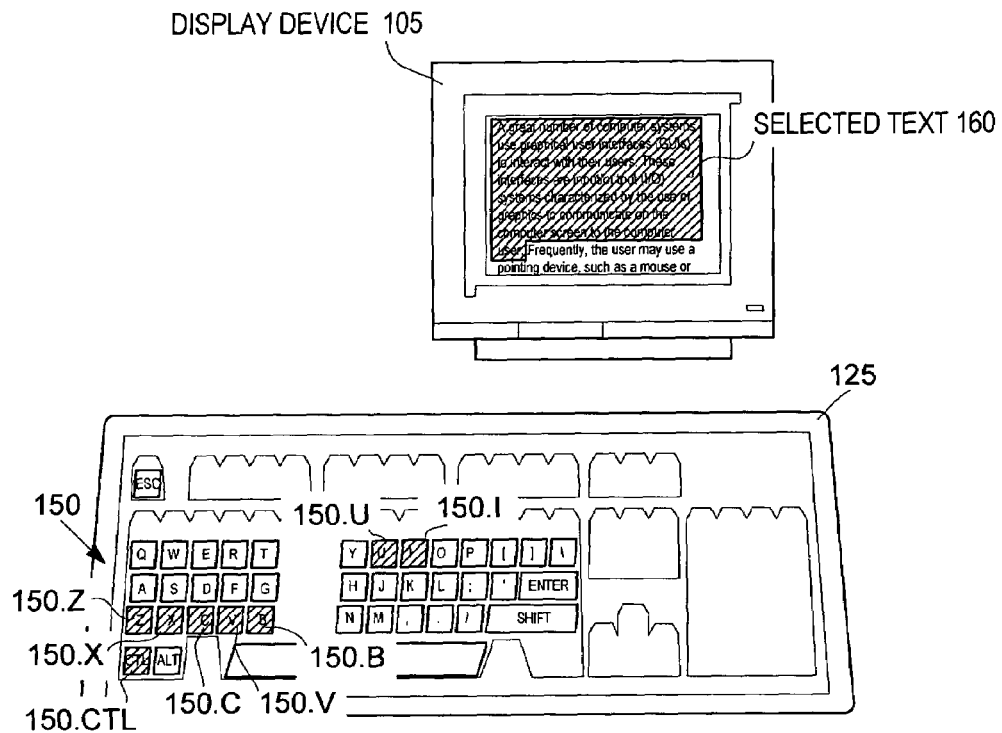
FIG. 1B illustrates a second group of illuminated hot key combinations for another context, according to an embodiment of the present invention.

Referring now to FIG. 1B, in this instance the user has selected certain text 160, as shown, and has pressed the "Control" key 150.CTL. The process detects the pressed key 150.CTL, that the key 150.CTL is common to a number of hot key combinations, the context of the word-processing application, and that for this context a different set of keys 150 are valid hot key combinations that include the pressed key 150.CTL. In this case the set includes, as shown, the "Z" key 150.Z and the "V" key 150.V, as previously described, the "X" key 150.X, which will cause the selected text 160 to be cut, the "C" key 150.C, which will cause the selected text 160 to be copied to the clipboard, the "B" key 150.B, which will cause the selected text 160 to be changed to a bold font, and the "I" key 150.I, which will cause the selected text 160 to be changed to an italic font.

Figure 1C:
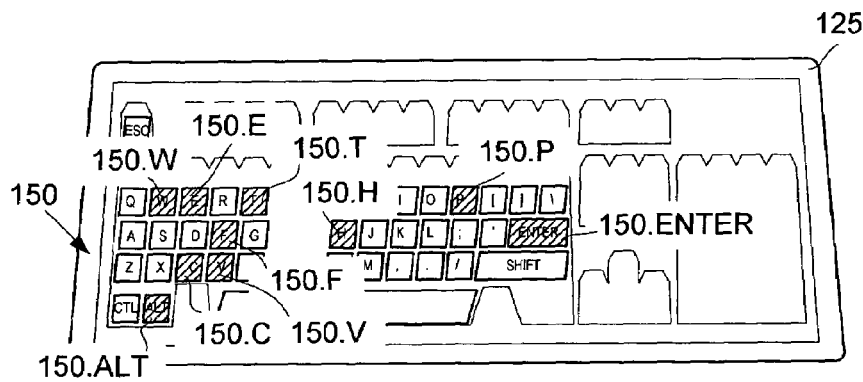
FIG. 1C illustrates a third group of illuminated hot key combinations for a third context.

Referring now to FIG. 1C, in this instance the user has not selected any text, as in FIG. 1A, and has pressed the "Alt" key 150.ALT. The process detects the pressed key 150.ALT, that the key 150.ALT is common to a number of hot key combinations, the context of the word-processing application, and that for this context a yet another set of keys 150 are valid hot key combinations that include the pressed key 150.ALT. In this case the set includes, as shown, the "W" key 150.W, which invoke the "window" command, the "E" key 150.E, which will invoke the "edit" command, the "T" key 150.T, which will invoke the "text" command, the "P" key 150.P, which will invoke the "page" command, the "F" key 150.F, which will invoke the "file" command, the "H" key 150.H, which will invoke the "help" command, the "C" key 150.C, which will invoke the "create" command, and the "V" key 150.V, which will invoke the "view" command.

Figure 2:
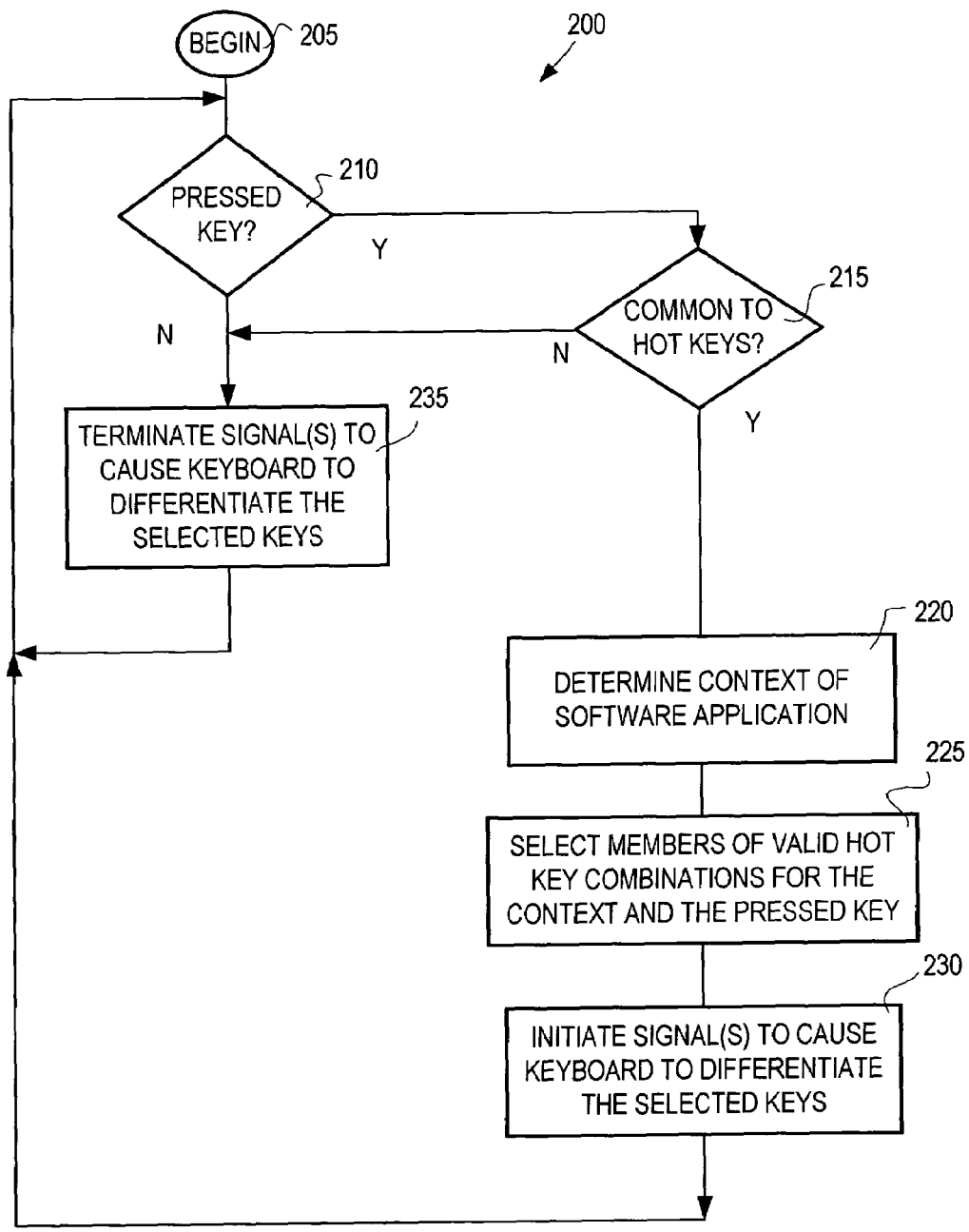
FIG. 2 illustrates logical aspects of a process for automatically and interactively providing keyboard prompts, according to an embodiment of the present invention.

Referring now to FIG. 2, logical aspects of a process are shown in flow chart fashion, according to an embodiment of the present invention. (Note that it should be understood that this illustrates one embodiment and that actions in other embodiments are not necessarily performed in the particular sequence in which they are set out in FIG. 2 and in the following description.) In logic block 205 the logical flow begins. Then, at 210 the process detects whether a key is pressed. Next, at 215, responsive to the detection of the pressed key the process determines whether the pressed key is common to a number of hot key combinations. If no at 215, then the process branches to block 235 and does not differentiate any keys. If yes at 215, then at 220 the process determines the context of the word-processing application. At 225 the process selects the set of keys that are members of valid hot key combinations for this context and that include the pressed key. At 230 the process initiates a signal or signals to cause the keyboard to differentiate the selected keys, such as by illuminating them. The process then branches back to block 210 to check for the pressed key. When the key is released, then at 235 the process terminates the differentiation of keys.

A keyboard driver 305 is coupled to circuitry 310 of the keyboard 125 to control communication between the keyboard 125 and an active application 315, such as a word processing application, and the operating system 320. That is, keyboard driver 305 listens on a hardware interrupt line driven by circuitry 310 for keyboard 125 events such as when a key 150 (FIG. 1) is pressed and when a key 150 is released, and passes that information to the operating system 320. The operating system 320 passes it to an active user application 315, referred to also herein as the "first" or "second" application, depending on which one of two representative user applications is active.

A keyboard application 325 in the nature of a terminate-stay-ready-application communicates with the first application 315 via the operating system 320 and tells the keyboard driver 310 which keys 150 to light up responsive to receiving that information from the first application 315. (A terminate-stay-ready-application is one that takes up memory but not processor cycles until such time as the application is called on to take some action.) The keyboard application 325 serves as a map between the keyboard driver 305 and the first application 315. The keyboard application 325 (or alternatively the keyboard driver 305) also monitors the first application 315 to see if it has closed down or become inactive, that is, moved to the background, in which case the keyboard application 325 causes the keyboard driver 305 to reset the lights on the keyboard 125, that is, to extinguish the lights, and notifies newly active, second application 330 that it is in control of the hot keys 150. In the present application, lights are embedded in keys 150 instead of or in addition to vibrators 255 shown in FIG. 2 of the above cross-referenced and incorporated patent application.

The active user applications 315 or 330 do much of the work. That is, for example, when the first application 315 is active it is the primary controller of the keyboard 125 lighting feature because the operating system 320 doesn't otherwise have information about what hot keys 150 are specific to the first application 315. When a user presses a key 150, such as the <alt> key 150.ALT (FIG. 1), the first application 315 has control and responds to the pressed key 150.ALT. The first application 315 passes data indicating what keys 150 are to light up to the keyboard application 325, which converts the information to information useful to the keyboard driver 305.

The first application 315 conventionally includes means for determining a hot-key-related context, since the first application 315 conventionally must understand which hot keys 150 are valid in which contexts. Therefore it should be understood that since the first application 315 is in control of which keys 150 are illuminated or otherwise distinguished, according to an embodiment of the present invention, the keyboard application 315 does not have, nor does it need, any information regarding the context of the first application 315, except with respect to "context" in the sense of one user application 315 switching from the foreground to the background, which may result in turning the key 150 lights off in connection with the switch, as described further herein below.

The keyboard driver 305 or the keyboard application 325 also stores the state of each key 150, indicating whether the key 150 is lit up or not. In this manner, the application 325 can query the keyboard driver 305 or keyboard application 325 to determine the state of each key 150. The first user application 315 also stores this information directly, but it is stored in the keyboard driver 305 or keyboard application 325 as well, in case the information is corrupted or lost. According to an aspect of an embodiment of the invention, the keyboard application 325 or the keyboard driver 305 includes an API that the first user application 315 or the keyboard application 325 can call to light up a key 150 on the keyboard 125.

The first user application 315 receives information in a conventional manner indicating keyboard 125 events. For example, when the <alt> key 150.ALT is pressed it is conventional for the first application 315 to receive this information. According to the present invention, an API call is added to the first application 315 to enable the application 315 to call for the keyboard driver 305, such as via the operating system 320 and the keyboard application 315, to light up the applicable hot keys 150 responsive to receiving the conventional indication that the <alt> key 150.ALT is pressed, for example. That is, responsive to receiving the indication that the <alt> key 150.ALT is pressed, the first application 315 looks at its conventional list of hot keys 150 to see if this particular key 150; is one of the keys 150 that is common to a number of hot key 150 combinations. Responsive to determining that the key 150 is one such key 150, the first application 315 calls the API to light up the set of keys 150 associated with hot keys 150 including the <alt> key 150.ALT.

When the first user application 315 is switched to the background and a second user application 330 is switched to the foreground, the first application 315 notifies the keyboard application 325 to turn off all the lit up keys 150. Alternatively, the keyboard application 325 automatically turns off all the key 150 lights responsive to detecting that the first application 315 is switching to the background. The keyboard application 325 receives this application switching indication from the operating system 320. The second user application 330 receives a conventional notice that it is being switched to the foreground, that is, switched to become the active application. Once again, the newly active, second user application 330 is notified in the conventional manner, of course, regarding keys 150 on the keyboard 125 that are pressed, and determines if any of the keys 150 that are pressed are keys 150 that are common to hot key 150 combinations. And, as before, the newly active application 330 also determines its hot-key-related context, and based on these determinations indicates to the keyboard application 325 which keys to light up.

Note that there are certain hot keys 150 associated with the operating system 320, such as the <alt><f4> combination, which shuts down the active user application 315 or 330. In one alternative, operating system 320 hot keys 150 are also supported. That is, for example, if the <alt> key 150.ALT is pressed, the <alt> and <f4> keys 150.ALT and 150.F4 remain lit even though the first application 315 is switched to the background. According to an embodiment of the invention, the keyboard application 325 may be set by a user to indicate whether operating system 320 hot keys 150 are subject to being lit up or otherwise distinguished. This is enabled by a profile configuration inside of the keyboard application 325. This profile configuration has capabilities that relate to the operating system 320, untriggered applications (i.e., applications that are in the foreground and is not setup for using the keyboard capabilities of the present invention), and triggered applications (i.e., applications that are in the foreground and are setup for using the keyboard 150 capabilities of the present invention). For the operating system 320, a default profile of the keyboard application 325 contains basic operating system 320 shortcuts which can be enabled/disabled by the user. For an active untriggered application, the keyboard application 325 checks the identity of the active user application 315 or 330 and assigns the hot key 150 light up action based on a profile in the keyboard application 325 for the identified application 315 or 330. For an active triggered application, the keyboard application 325 is notified that the active user application 315 or 330 is controlling the keyboard. The active user application 315 or 330 also indicates to the keyboard application 325 whether to disable the default operating system 320 profile. Thus, for the operating system 320 and untriggered applications the keyboard application 320 is in control of initially capturing key 150 presses and filling in the keyboard 125 related functions normally performed by the active user application 315 or 330. In contrast, a triggered application has the option of retrieving default keystrokes from the keyboard application, while remaining in control of the keyboard action.

According to an embodiment of the invention, the active user application 315 or 330 can query the keyboard application 325 to find out all the keys 150 that are lit up or can send a query regarding a specific key 150 to see if that key 150 is lit. The query is another API call added to the active user application 315 or 330. Data that is passed back to the active user application 315 or 3330 for a query concerning all the lit up keys 150 is an array of bits where each bit corresponds to a key 150 on the keyboard 125. Alternatively, identifiers for just the lit up keys 150 are passed back to the active application 315 or 330 for such a query.

Some applications have a large number of hot keys 150. For such applications the user may decide that a limited set of the possible hot keys 150 are more commonly used by that particular user. Consequently, according to one embodiment of the invention, a user preference choice is added to the first or second user application 315 or 330 by which the user can select which hot keys 150 will be subject to being lit up.

The keyboard driver 325 turns lights on and off by sending serial data for switches (not shown in FIG. 3) in hardware circuitry 310, the switches being associated with respective keys 150. According to one embodiment, the driver 305 sends a bit or byte array indicating the state for each key 150. According to another embodiment the driver 305 sends an identifier for each key 150 that is to be lit, or, alternatively, an identifier for each key 150 that is to be not lit.

Figure 3:
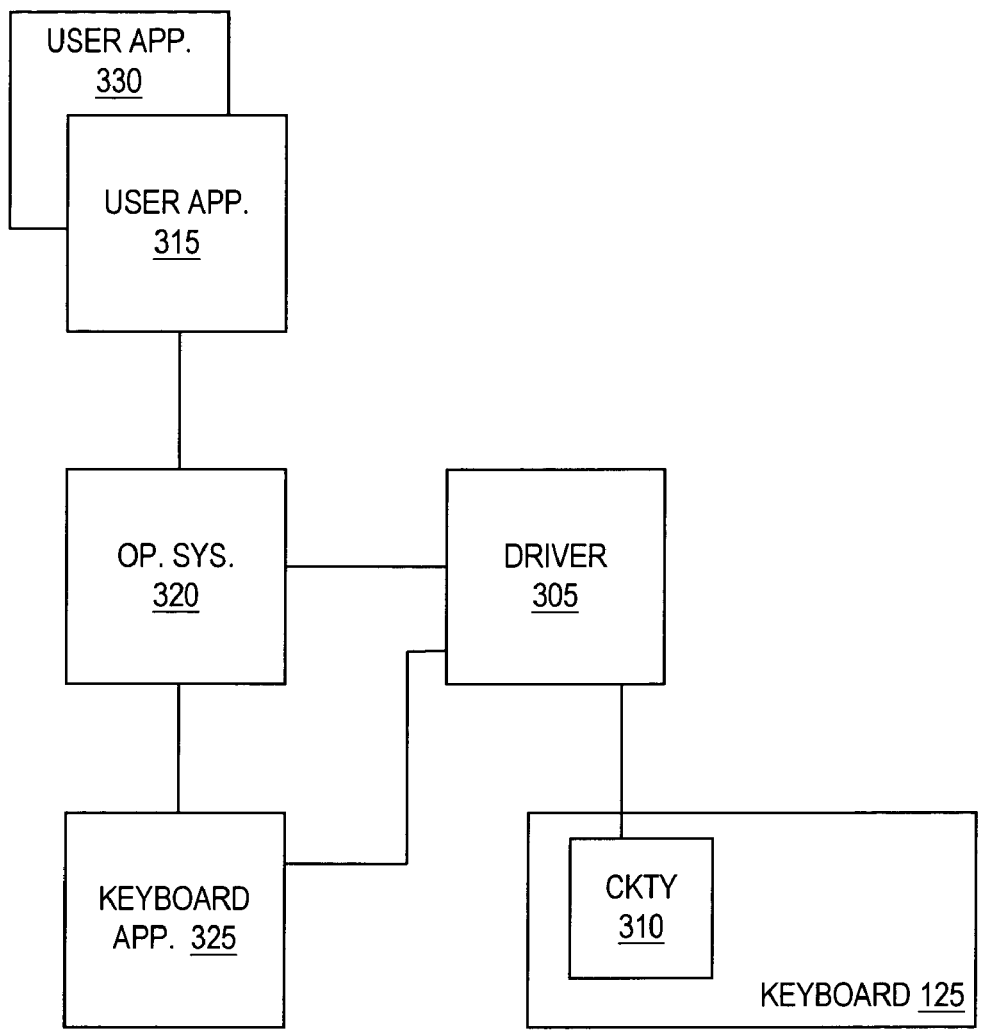
FIG. 3 illustrates logical aspects of a computer program product for automatically and interactively providing keyboard prompts, according to an embodiment of the present invention.

According to one embodiment of the invention, circuitry 310 associated with the keyboard includes a decoder and a memory (not shown in FIG. 3). Hardware for lighting keys responsive to signals from a computer processor is well-known. See, for example, Garcia, Jr., U.S. Pat. No. 4,641,026, "Optically activated keyboard for digital system," Feb. 3, 1987 and Garcia, Jr., et al., U.S. Pat. No. 5,034,602, "Optically activated keyboard for digital system having character back lighting," Jul. 23, 1991, which are hereby incorporated herein by reference.

The description of the present embodiments have been presented for purposes of illustration, but are not intended to be exhaustive or to limit the invention to the forms disclosed. Many additional aspects, modifications and variations are also contemplated and are intended to be encompassed within the scope of the following claims. For example, the processes of the present invention are capable of being distributed in the form of a computer readable medium of instructions in a variety of forms. The present invention applies equally regardless of the particular type of signal bearing media actually used to carry out the distribution. Examples of computer readable media include RAM, flash memory, recordable-type media such as a floppy disk, a hard disk drive, a ROM, CD-ROM, DVD and transmission-type media such as digital and/or analog communication links, e.g., the Internet.

The description herein has focused on an embodiment for a word-processing software application, but it should be appreciated that the invention is also suitable for use with many other software applications. To reiterate, many additional aspects, modifications and variations are also contemplated and are intended to be encompassed within the scope of the following claims. Moreover, it should be understood that in the following claims actions are not necessarily performed in the particular sequence in which they are set out.

What is claimed is:

1. A method for providing keyboard assistance to a user of a software application, the method comprising the steps of:
   detecting a pressed keyboard key concurrently with the application being active, wherein the application has certain hot key combinations;
   selecting ones of the keyboard keys responsive to the key pressed, the selected keys corresponding to ones of the hot key combinations that include the pressed key: and
   sending at least one signal for differentiating the selected keys on the keyboard, wherein the application is operable to have a number of contexts and certain ones of the hot key combinations are valid for certain ones of the contexts and not valid for other ones of the contexts, and
   wherein the method comprises the step of:
   detecting the context of the application, wherein the selecting is responsive to the detected context and the selected keys correspond to ones of the hot key combinations that include the pressed key and that are valid for the detected context.

2. The method of claim 1, wherein at the time of sending the at least one signal the keyboard has no illuminated keys, and the differentiating includes illuminating the selected keys.

3. The method of claim 1, wherein at the time of sending the at least one signal all the keys of the keyboard are illuminated, and the differentiating includes extinguishing the illumination for the selected keys.

4. The method of claim 1, wherein the hot key combinations include a set of combinations for which a "control" key is one of the keys of the combination.

5. The method of claim 1, wherein the application includes a word processing function and the application contexts include a context in which text is selected.

6. An apparatus for providing keyboard assistance to a user of a software application, the apparatus comprising;
   a processor;
   a memory having instructions operable with the processor to perform;
   detecting a pressed keyboard key concurrently with the application being active, wherein the application has certain hot key combinations;
   selecting ones of the keyboard keys responsive to the key pressed, the selected keys corresponding to ones of the hot key combinations that include the pressed key; and
   sending at least one signal for differentiating the selected keys on the keyboard, wherein the application is operable to have a number of contexts and certain ones of the hot key combinations are valid for certain ones of the contexts and not valid for other ones of the contexts, and
   wherein the instructions in the memory are further operable with the processor to perform;
   detecting the context of the application, wherein the selecting is responsive to the detected context and the selected keys correspond to ones of the hot key combinations that include the pressed key and that are valid for the detected context.

7. The apparatus of claim 6, wherein at the time of sending the at least one signal the keyboard has no illuminated keys, and the differentiating includes illuminating the selected keys.

8. The apparatus of claim 6, wherein at the time of sending the at least one signal all the keys of the keyboard are illuminated, and the differentiating includes extinguishing the illumination for the selected keys.

9. The apparatus of claim 6, wherein the hot key combinations include a set of combinations for which a "control" key is one of the keys of the combination.

10. The apparatus of claim 6, wherein the application includes a word processing function and the application contexts include a context in which text is selected.

11. A computer program product for providing keyboard assistance to a user of a software application, the computer program product comprising:
- instructions for detecting a pressed keyboard key concurrently with the application being active, wherein application has certain hot key combinations;
- instructions for selecting ones of the keyboard keys responsive to the key pressed, the selected keys corresponding to ones of the hot key combinations that include the pressed key; and
- instructions for sending at least one signal for differentiating the selected keys on the keyboard, wherein the application is operable to have a number of contexts and certain ones of the hot key combinations are valid for certain ones of the contexts and not valid for other ones of the contexts, and wherein the computer program product comprises;
- instructions for detecting the context of the application, wherein the selecting is responsive to the detected context and the selected keys correspond to ones of the hot key combinations that include the pressed key and that are valid for the detected context.

12. The computer program product of claim 11, wherein at the time of sending the at least one signal the keyboard has no illuminated keys, and the differentiating includes illuminating the selected keys.

13. The computer program product of claim 11, wherein at the time of sending the at least one signal all the keys of the keyboard are illuminated, and the differentiating includes extinguishing the illumination for the selected keys.

14. The computer program product of claim 11, wherein the hot key combinations include a set of combinations for which a "control" key is one of the keys of the combination.

15. The computer program product of claim 11, wherein the application includes a word processing function and the application contexts include a context in which text is selected.

* * * * *